United States Patent [19]

Hochstein

[11] Patent Number: 5,170,151
[45] Date of Patent: Dec. 8, 1992

[54] METHOD AND ASSEMBLY FOR DISCONNECTING A BATTERY FROM ITS OPERATING SYSTEM

[76] Inventor: Peter A. Hochstein, 2966 River Valley Dr., Troy, Mich. 48098

[21] Appl. No.: 656,701

[22] Filed: Feb. 21, 1991

[51] Int. Cl.$^5$ ............................................ G08B 21/00
[52] U.S. Cl. ..................................... 340/636; 340/455; 307/10.7; 320/13; 320/48
[58] Field of Search ............... 340/636, 638, 438, 455; 320/48, 40, 13; 335/17; 307/10.7; 324/426, 433

[56] References Cited

U.S. PATENT DOCUMENTS

| | | | |
|---|---|---|---|
| 4,803,459 | 2/1989 | Ta | 340/636 X |
| 4,902,956 | 2/1990 | Sloan | 320/13 |
| 4,950,913 | 8/1990 | Kephart | 340/636 X |

*Primary Examiner*—Jin F. Ng
*Assistant Examiner*—Jeffery A. Hofsass
*Attorney, Agent, or Firm*—Reising, Ethington, Barnard, Perry & Milton

[57] ABSTRACT

A battery disconnect circuit (10) is shown for disconnecting a battery (12) from an electrical load (14). A voltage measuring circuit (32) constantly measures the voltage of the battery (12). When the voltage reaches a predetermined voltage, proportional to the stored electrochemical energy sufficient to start a vehicle one time, a circuit breaker (24) disconnects the battery (12). An inhibitor (53) senses the operation of the engine (31) through an electret microphone (94) and inhibits the circuit breaker (24) from opening. An alarm disabler (58) senses the state of the circuit breaker (24), i.e., whether the circuit breaker (24) is open or closed, and disables the alarm (42) if the circuit breaker (24) is closed. A trigger (41) through a sensor (R1) sensing a drop in voltage due to an operator trying to activate the starting subsystem (30), activates the alarm (42) to notify the operator that the battery (12) has been disconnected. The activation of the alarm (42) only occurs in the presence of the operator.

47 Claims, 3 Drawing Sheets

METHOD AND ASSEMBLY FOR DISCONNECTING A BATTERY FROM ITS OPERATING SYSTEM

BACKGROUND OF THE INVENTION

1. Field of the Invention

This invention relates to the regulation of the discharge of an electrochemical battery. More particularly, the subject invention relates to circuitry which terminates the discharge of an electrochemical battery.

2. Description of Related Art

Drivers of vehicles and craft alike are frequently confronted with the problem of a dying or a dead battery. A dead battery is often a result of an accident, e.g., accidently leaving the lights on or leaving the interior dome light on. Additionally, the modern electronics found on newer automobiles can drain the battery to the point where it cannot start the engine.

One attempt to avoid this problem includes a battery housing actually containing two separate and distinct batteries. The battery used for everyday use comprises two-thirds of the housing volume. The smaller battery, which takes up the remaining one-third of the battery housing, is only used in emergencies by means of a manual switch, when the larger battery can no longer start the engine; the second battery being kept charged through an isolation diode. This solution to the problem of the stranded traveler is not ideal for two reasons. First, the everyday battery is only two-thirds the size of the battery specified by the vehicle manufacturer for the vehicle. Problems occur because of excessive drain on the battery and a lower available capacity. Insufficient power for on-board electronic components then begin to arise merely because the battery is too small for the particular application.

Second, the emergency battery is carried at all times and represents dead weight through most of the life of the battery. Additionally, the emergency battery must be switched over manually after emergency starting so that it may once again be charged by the vehicle charging system. Should the owner forget this step, the two batteries act as one and have no emergency back up utility.

A second solution to the problem of a dead battery is disclosed in U.S. Pat. No. 4,902,956 to Sloan, issued on Feb. 20, 1990. This invention comprises a circuit breaker which disconnects non-critical accessories when the charge on the battery drops below a predetermined level as measured by a voltmeter. An override switch allows the operator of the vehicle to reconnect the non-critical accessories. The circuit breaker receives a disabling signal when the engine is running so as not to disconnect the non-critical accessories during the operation of the vehicle.

This system does not, however, automatically alert the operator of the battery disconnection when the operator tries to start the vehicle. Nor does this invention disclose the capability of eliminating all current drains; drains created from such components as the starter and microprocessors which will eventually drain the battery even with the non-critical circuits disconnected.

SUMMARY OF THE INVENTION AND ADVANTAGES

An automatic battery disconnect assembly is disclosed for disconnecting a battery from the electrical load associated with a vehicle and engine therefor. The battery is automatically disconnected from the electrical load when the battery drops below a predetermined voltage. The assembly comprises a battery terminal for connection to the battery and an electrical load terminal for supplying all electrical power to the vehicle. The assembly also includes a main circuit electrically connecting the terminals and circuit breaker means movable between an open position and a closed position for opening the main circuit to disconnect the battery terminal from the electrical load terminal. Voltage measuring means is used for measuring the voltage available at the battery terminal and for opening the circuit breaker means in response to measuring a predetermined low voltage. The assembly is characterized by trigger circuit means interconnecting the terminals independently of the main circuit for producing an alarm signal when the circuit breaker means is open and in response to a predetermined change in load applied to the electrical load terminal. The advantage to such an assembly is that all electronic componentry is disconnected from the battery eliminating all parasitic current drains from the battery and that the alarm is selectively activated to signal the operator only when the operator is present to take action. An added advantage is that the subject invention can be installed universally in any vehicle by virtually anyone, without connection to the vehicular wiring harness.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
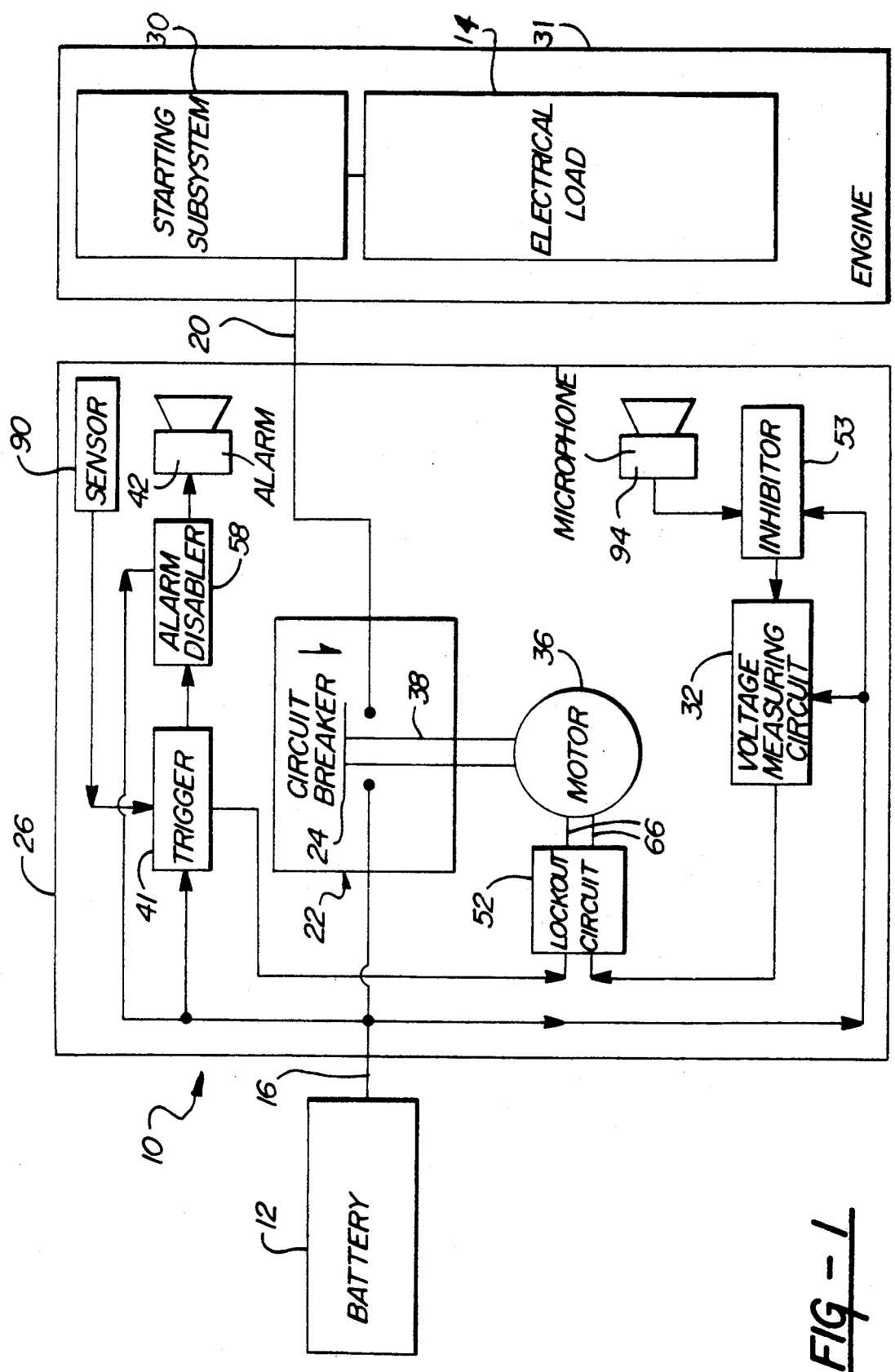
FIG. 1 is a block diagram of the preferred embodiment of the subject invention.

Referring to FIG. 1, the subject invention is generally shown at 10. The subject invention 10 is an automatic battery disconnect assembly and is used to disconnect a battery 12 from an electrical load 14 when the battery 12 has reached a predetermined voltage. The automatic battery disconnect assembly 10 includes a battery terminal 16, which connects the automatic battery disconnect assembly 10 to the positive terminal 18 of the battery 12, and an electrical load terminal 20 which connects the automatic battery disconnect assembly 10 to the electrical load 14 associated therewith. A main circuit, generally shown at 22 electrically connects the two terminal 16,20 together. The main circuit 22 includes circuit breaker means 24 for disconnecting the two terminals 16,20 from each other when the voltage available at the battery 12 drops below the predetermined load voltage.

Figure 3:
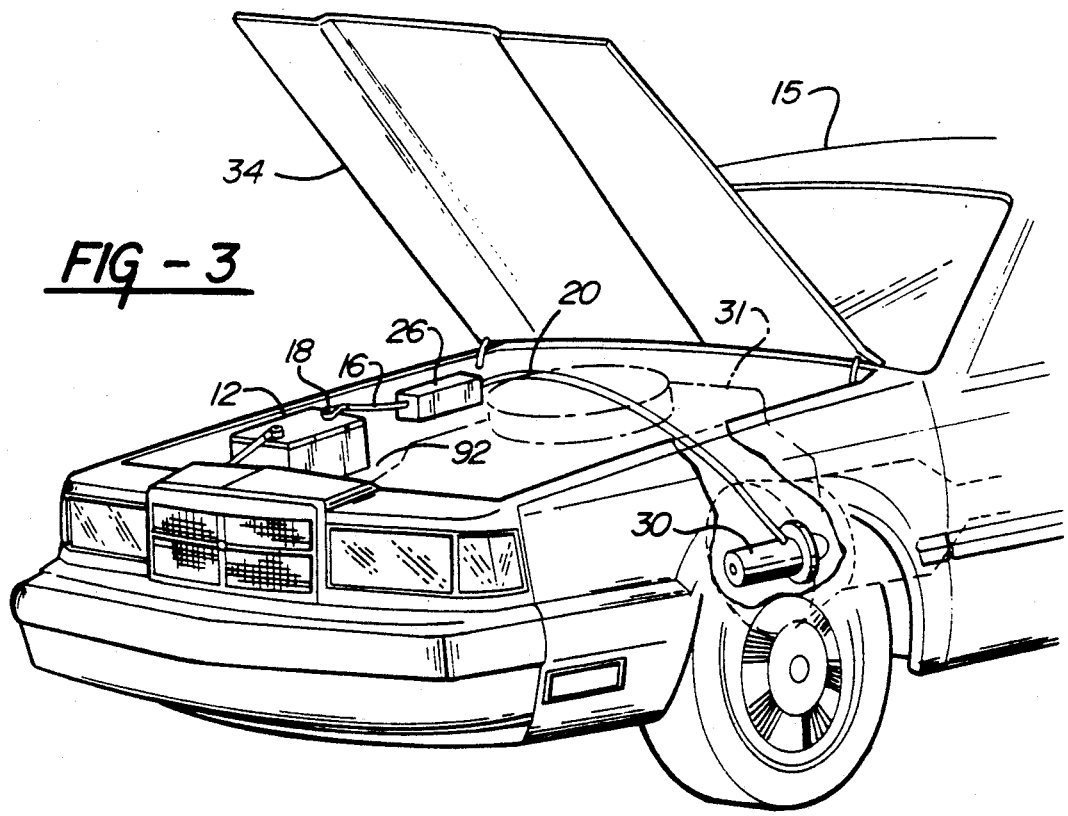
FIG. 3 is a perspective view of the subject invention in the engine compartment of an automotive vehicle partially cut away.

An assembly housing 26, as may be best seen in FIG. 3, houses the entire main circuit 22 and portions of the two terminal 16,20. At least the ends of the two terminal 16,20 must be electrically accessible to provide electrical contacts between the battery 12 and the electrical load 14. The ends of the two terminal 16,20 may extend out from the assembly housing 26 to facilitate installation of the subject invention 10. The assembly housing 26 may be adapted to be recessed within a battery housing 28. In this instance, the electrical load terminal 20 would extend out of the battery housing 28 to be connected with the electrical load 14. In other words, the electrical load terminal 20 would resemble the positive terminal 18 of the battery 12.

The electrical load 14 is used to describe the total electrical and electro-mechanical systems and circuits associated with the operation of a vehicle 15 or a marine craft. The electrical load 14 also includes the starting subsystem 30 which is necessary to start the engine 31, i.e., the engine 31 or electro-mechanical device. The starting subsystem 30 requires current on the order of 300-450 Amps and is normally connected between the battery 12 and the electrical load 14. The subject invention 10 will be placed in series between the battery 12 and the starting subsystem 30 to prevent the current from draining through the starting subsystem 30.

For simplicity, the remainder of the disclosure will refer solely to vehicular systems, such as an automobile 15, as shown in FIG. 3. It should be noted, however, that the subject invention 10 may be used with any type of electrical load 14 wherein a battery 12 is used to supply power to a system, whether it be a vehicle 15, marine craft or even a stationary machine.

The battery disconnect assembly 10 includes a voltage measuring means 32 for measuring the voltage of the battery 12. The battery disconnect assembly 10 includes a main circuit 22 which further includes circuit breaker means 24 for disconnecting the battery 12 from the electrical load 14. The circuit breaker means 24 will disconnect the battery 12 only when the voltage level of the battery 12 falls below the predetermined voltage level. The level of voltage necessary to trip the circuit breaker means 24 is the voltage proportional to the stored Ampere-hour capacity necessary to successfully engage the starting subsystem 30 of the electrical load 14. In the case of a vehicle 15, the predetermined level will be just above the minimal voltage necessary to start the engine 31. If the operator can start the engine 31, the operator, at the very least, will not be stranded and may even be able to recharge the battery 12 for future use.

The circuit breaker means 24 will be able to be reset thus closing the main circuit 22 in one of two ways. The first way is manually forcing the circuit breaker means 24 back to its closed circuit position. To do this, the operator must access the engine 31 by opening the hood 34 and move the movable portion (not shown) of the circuit breaker means 24. An insulated button or lever may be suitable to move the movable portion of the circuit breaker means 24 without having to touch any electronic circuitry. The second way of forcing the circuit breaker means 24 back to its closed circuit position is the preferred embodiment of the subject invention 10. The circuit breaker means 24 is forced back to its closed position by electro-mechanically moving it back to the closed circuit position. A motor 36 with a gear train 38 electro-mechanically moves the circuit breaker means 24 back to the closed position. The motor 36 is a reversible d.c. permanent magnet motor 36 with an overrunning clutch. Although easier to operate, this auto reset system requires only a slightly higher predetermined voltage so that enough battery energy would be saved by the automatic battery disconnect assembly 10 so the assembly 10 may reconnect itself, in addition to starting the engine 31. A more complete description of the circuit breaker means 24, including how it is able to operate with currents in the neighborhood of 400 Amps, is presented in U.S. Pat. No. 4,163,135 issued to Steen on Jul. 31, 1979.

The subject invention 10 further comprises a switchable alarm circuit 40 which includes an alarm 42 connected in parallel with a capacitor C10 for alerting the operator of the vehicle 15 that the battery 12 has been disconnected. The alarm 42 may be any device suitable for producing an audible sound within the range of frequencies sensible by the human ear, i.e., 20 Hz-20 kHz, and will notify the operator that the battery 12 has been disconnected. Such devices include, but are not limited to, horns, electronic tones, electronically synthesized voices, and warning lights. In order to prevent the subject invention 10 from completely draining the battery 12 down to a voltage level below the predetermined level, the alarm 42 will be activated only for a specified time up to five minutes after which the alarm 42 will be deactivated. In the preferred embodiment of the subject invention 10, the alarm 42 is a piezo horn which is an 'off-the-shelf' product. The alarm 42 is supported by the assembly housing 26 to facilitate the ease in installation and reduce the risk of damage due to the harsh environment created by the engine 31 of the vehicle 15.

In addition to the audible alarm 42, the alarm circuit 40 could operate a visual alarm. This type of alarm would be located in the passenger compartment of the vehicle 15, and in fact, could be part of the instrument panel of the vehicle 15. This alternative embodiment would be ideal when the subject invention 10 is incorporated into the manufacturing of the complete vehicle 15 and not designed to be installed by the purchaser of the vehicle 15. In the case of the alternative embodiment, the audible alarm 42 may be coupled with the visual alarm to help insure the operator will be alerted.

Referring to FIG. 1, the battery disconnect assembly 10 is characterized by trigger circuit means 41 connected to the battery 12 for producing an alarm signal which is sent to the alarm 42 in response to a predetermined change in load corresponding to such events as a closure of the starting load switch 50 to operate the starting subsystem 30. The trigger circuit means 41 allows power to reach the alarm 42 only upon sensing the presence of an operator of the vehicle 15. It would be counterproductive to have a battery disconnect assembly 10 if the alarm 42 will be activated from the time the voltage level drops to a dangerously low level until an operator returns to the vehicle 15. In this instance, the alarm 42 has the potential of draining the battery 12 below the predetermined voltage level necessary to reconnect the circuit breaker 24 and start the engine 31 thus rendering the battery disconnect assembly 10 counterproductive to the point of being harmful instead of helpful.

Figure 2:
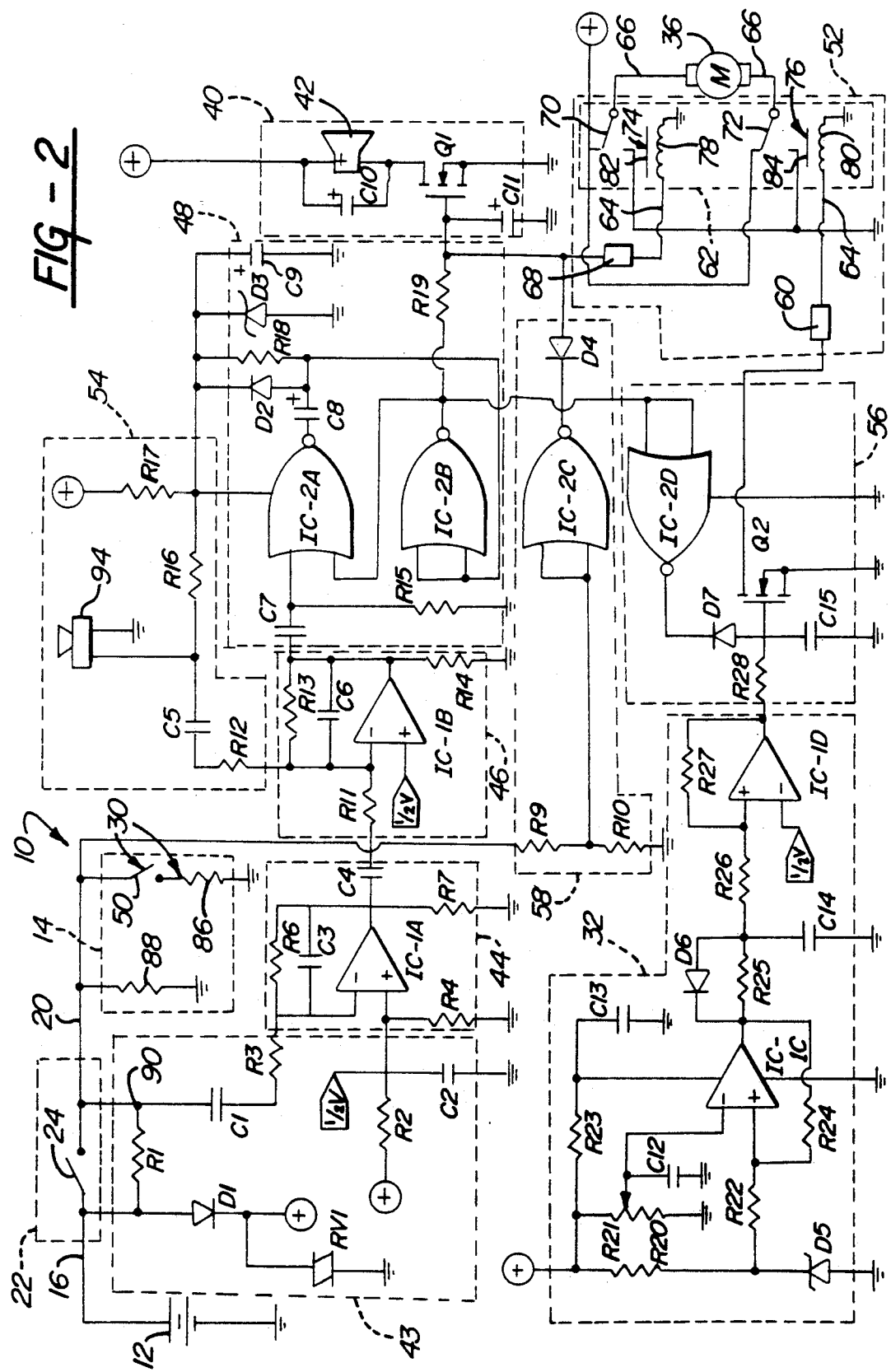
FIG. 2 is a schematic drawing of the preferred embodiment of the subject invention.

Again, the trigger circuit means 41 may be any sensor suitable for sensing the presence of an operator. In the preferred embodiment, the trigger circuit means 41 is a voltage sensor 48 which senses a small drop in voltage across a resistor. A more complete description of the trigger circuit means 43 as shown in FIG. 2 will be presented subsequently.

Because the automatic battery disconnect assembly 10 is connected directly between the battery 12 and the starting subsystem 3 caution must be taken to prevent arcing of electrical currents as the circuit breaker means 24 either approaches or retracts from the closed position. This becomes particularly important when the predetermined change in load occurs is the closing of the starting load switch 50, discussed subsequently, because an extremely large current will flow through the circuit breaker means 24 thus producing possibly damaging sparks. Because the preferred embodiment of the subject invention 10 includes a motor 36 which will automatically close the circuit breaker means 24 upon the predetermined change in load, lockout means 52 is incorporated for preventing the circuit breaker means 24 from moving to the closed position for a predetermined time after the predetermined change in load. The lockout means 52 could either be a timer or an interlock which will prevent the circuit breaker means 24 from moving to the closed position while the predetermined change in load exists. In the alternative embodiment, such a lockout means 52 will not be necessary because the operator will have to disengage the starting load switch 50 and manually move the circuit breaker means 24 to the closed position.

The battery disconnect assembly 10 further includes inhibiting means 53. The inhibiting means 54,56,46,48, as shown in FIG. 2, prevents the circuit breaker means 24 from disconnecting the electrical load 14 while the engine 31 is active. For various reasons, the voltage measuring means 32 may, during the operation of the engine 31, measure a drop in the voltage below the predetermined level. The inhibiting means 54,56,46,48 prevents the disconnection of the battery 12 from the electrical load 14 at these times. It would be highly undesirable for the disconnection of the battery 12 at these times because the operator of the vehicle 15 may be in placed in a dangerous position. As discussed above, there may also be a danger of arcing when the circuit breaker means 24 retracts from the closed position to the open position. The inhibiting means 54,56,46,48 will prevent any arcing from occurring while the engine 31 of the vehicle 15 is running.

The battery disconnect assembly 10 further includes alarm disabling means 58 for disabling the alarm 42 when the engine 31 is active. Power surges or spikes typically occur during the operation of vehicles and it is these power surges which could annoyingly activate the alarm 42. The alarm disabling means 58 detects the condition of the circuit breaker means 24, i.e., whether the circuit breaker means 24 is in the open or closed position, and disables the alarm 42 if the circuit breaker means 24 is in the closed circuit condition. In other words, the alarm 42 cannot be activated so long as the electrical load 14 is connected to the battery 12. The subject invention 10 determines whether or not the electrical load 14 is connected to the battery 12 by sensing whether the circuit breaker means 24 has opened. The alarm disabling means 58 will be discussed in greater detail subsequently.

Returning our attention to the trigger circuit means 43,44,46,48 and FIG. 2, the sensing current path is provided by the resistor R1 when the circuit breaker means 24 is opened disconnecting the battery 12. The trigger circuit means 43,44,46,48 may be powered directly by the battery 12 as it draws less than 5 mA. Said another way, a parallel path through the resistor R1 exists in which a very small current may flow therethrough to continue to power the main circuit 22. This same current will be used to power the alarm 42 as well as being sensed by the alarm disabling means 58. It should be understood that the current passing through the resistor R1 is far too small to operate most, if not all, of the electrical load 14.

An individual, independent power source could be incorporated to power the sensing circuits and the alarm 42 but this would be inefficient in a number of ways. First, the independent power source would only be used once or twice in its lifetime. Second, the independent source may itself be drained during normal operations which would give the operator a false sense of security because the alarm 42 would never be activated and the circuit breaker means 24 would never be reconnected if a motor 36 is used to reconnect the battery 12 to the electrical load 14. And third, the independent source of power would add weight to the vehicle 15. In other words, the independent source would add nothing to the operation of the subject invention 10 nor the vehicle 15 during the majority of its life.

A transient suppressor varistor RV1 prevents excessive voltages from damaging the subject invention 10. A diode D1 provides reverse voltage protection. The voltage measuring means 32 includes a diode D5, which is a micropower voltage reference (LM385) that establishes the reference voltage for a comparator IC-1C. In the preferred embodiment, the comparator IC-1C is one of four operational amplifiers in a integrated circuit chip such as a TL064. The voltage of the battery 12 is measured by the divider established by a trimmer resistor R21. A resistor R20 is connected between the diode D5 and the trimmer resistor R21. A capacitor C12, connecting between the inverting input of the operational amplifier IC-1C and the trimmer resistor R21 provides noise suppression for an accurate reading. Additional circuitry is added to enhance the noise independence of the operational amplifier IC-1C. This addition circuitry is an RC filter wherein the resistor R23 and the capacitor C13 create the RC filter wherein the resistor R23 is connected between the power source and the capacitor C13, the capacitor C13 also being connected to ground. A resistor R24, connected between the output and the noninverting input of the operational amplifier IC-1C, is used to provide comparator hysteresis.

The output of the operational amplifier IC-1C drives the timing circuitry, a resistor R25 and a capacitor C14, wherein the resistor R25 is connected to the output of the operational amplifier IC-1C and the capacitor C14 is connected between the other end of the resistor R25 and ground. The timing circuitry R25,C14 define a time delay wherein the circuit breaker means 24 will not disconnect the battery 12 unless the predetermined voltage level is measured for a period of time greater than the time delay established by the timing circuitry R25,C14. In other words, the timing circuitry R25,C14 prevents the spurious operation of the battery disconnect assembly 10 by insuring a low voltage reading exists for a defined period of time before the opening of the circuit breaker means 24. A diode D6 is connected in parallel with the resistor R25 to provide a virtually instant reset if the low voltage level does not last for the time period defining the time delay.

The operational amplifier IC-1D is also configured as a comparator with a resistor R26 connected to its noninverted input and to the resistor R25. The resistor R26 limits the discharging current from the capacitor C14 which is connected between ground and the resistor R26. The resistor R27, connected between the output and the noninverting input of the operational amplifier IC-1D, provides the necessary hysteresis for the operational amplifier IC-1D. The inverting input supplies the reference voltage for the comparator IC-1D is set to one half the supply voltage.

Therefore, the output of the comparator IC-1D switches from low to high when the voltage at the noninverting input reaches one half of the supply voltage. The high output charges a capacitor C15, through a resistor R28. The capacitor C15 is connected between ground and the gate of an inhibitor switching means, a MOSFET Q2 in the preferred embodiment. When the voltage at the gate of the MOSFET Q2 reaches a sufficient level, approximately 4 volts for the preferred embodiment, the MOSFET Q2, configured in common source mode, will energize a monostable multivibrator 60. A diode D7 is connected between the resistor R28 and a NOR gate IC-2D (to be discussed subsequently) to inhibit the gate of the MOSFET Q2 when the engine is operating.

The lockout means 52, when energized, will move the circuit breaker means 24 to disconnect the battery 12 from the electrical load 14. The lockout means 52 includes an H-switch 62 having two input terminals 64 and two output terminals 66. Each of the two output terminals 66 are connected to each of the two terminals of the motor 36. The two input terminals 64 of the H-switch 62 are each connected to a separate monostable multivibrator 60,68. The monostable multivibrators 60,68 each produce a pulse signal wherein, in the preferred embodiment, the pulse has a period of 250 milliseconds. The first monostable multivibrator 68 is connected to the trip signal as produced by the trigger circuit means 43,44,46,48. The second monostable multivibrator 66 is connected to the voltage measuring means 32. Therefore, when a signal is received from the voltage measuring means 32 signalling a drop in voltage to the predetermined voltage level and no signal is received from the voltage measuring means 32, the motor 36 is moved to the open position. If, however, the pulse produced by the first monostable multivibrator 68 has passed and a signal is received from the trigger circuit means 43,44,46,48, the motor 36 will then move the circuit breaker means 24 to the closed position.

The pulses received by the monostable multivibrators 60,68 move switch contacts 70,72 of the H-switch 62 by energizing the relays, generally indicated at 74,76 associated with each of the switch contacts 70,72. The relay coils 74,76 each comprise a coil 78,80 and a core element 82,84, although the combinations of relay coils 78,80 and core elements 82,84 will not always be necessary as would be obvious to anyone skilled in the art. The H-switch 62 is a dual pole, double throw switch with a reversing relay function. The H-switch 62 may be solid state, i.e., of MOSFET or a Bipolar Transistor configuration, or it may be an electromechanical relay.

As was discussed previously, when circuit breaker means 24 has been moved to the open position effectively disconnecting the battery 12 from the electrical load 14, trigger circuit means 43,44,46,48 must sense the presence of an operator before the alarm 42 may be activated. Opening a car door typically energizes interior lights, which may activate trigger circuit means 43,44,46,48 thereby resetting or closing the circuit breaker means 24. However, the interior lights may in fact be the cause of the parasitic drain if they were inadvertantly left on. In such a case, the opening of a car door would not be sensed because no new additional electrical load would be imposed to the resistive loads 88. A true operator may be sensed consistently by sensing when the starting load switch 50, commonly referred to as an ignition switch, is being closed, an event representing an attempt to start the vehicle 15. When the starting load switch 50 is closed, however, the only change in the electrical load 14 is the resistive loads 86 of the starting system 30 which are now in parallel with the resistive load 88 representing such parasitic resistive loads 88 as headlights, taillights, radio, etc. of the electrical load 14 which may have been left energized thus draining the battery 12. This translates into a very small additional drain of current and, therefore, a very small voltage drop at the voltage sensing point 90, a connection between the electrical load 14, the circuit breaker means 24, and a resistor R1. The resistor R1 is connected in parallel with the circuit breaker means 24 to provide the small current to the rest of the subject invention 10 so it may sense the presence of an operator.

It may be easily shown that the detection of changes in voltage at the voltage sensing point 90 will be difficult. By way of example, with a parasitic load of 10 Amperes, a load representative of the courtesy lights of a vehicle 15, the resistive load 88 would equal approximately 1.2 Ohms. When the circuit breaker means 24 is in the open position, sending a small current of approximately 10 mA through the resistor R1, the voltage at the voltage sensing point 90 would equal approximately 12 mV. Assuming an ignition load of nominally 1 A for an effective ignition resistive load 86 of 12 Ohms, the value of the parallel resistor formed by the resistive loads 86,88 would equal 1.09 Ohms. The corresponding voltage at the voltage sensing point 90 would now equal about 10.9 mV. Therefore, the voltage at the voltage sensing point 90 has dropped only 1 mV.

A drop of 1 mV in a vehicular environment is difficult to sense so it must be amplified to be properly detected before the alarm 42 can be activated. A.C. amplifying means 44,46 is included for amplifying the voltage drop across the resistor R1. The amplifying means 44,46 is a two stage cascaded amplifier circuit having first IC-1A and second IC-1B operational amplifiers. The inverting input of the first operational amplifier IC-1A is connected to the resistor R1 through a resistor R3 and capacitor C1. The noninverting input of the first operational amplifier IC-1A is connected to the following all in parallel; two resistors R2,R4, a capacitor C2 and one half the supply voltage. The capacitor C1 and the resistor R4 are also connected to ground and the resistor R2 is also connected to the diode D1 and the transient suppressor varistor RV1. A feedback resistor R6 and a high frequency roll-off capacitor C3 establish the gain and frequency response of this first stage operational amplifier IC-1A. The output of the first operational amplifier IC-1A is connected to both a resistor R7 and a capacitor C4. The capacitor C4 couples the first IC-1A and second IC-1B operational amplifiers together and the resistor R7 provides for the discharge of the capacitor C4.

The inverting input of the second stage IC-1B of the amplifier 46 is connected to the first stage 44 via a resistor R11. The noninverting input of the second stage operational amplifier IC-1B is connected to one half the supply voltage. A resistor R13 and a capacitor C6 provide the stage gain and the frequency response of the second stage operational amplifier IC-1B. The capacitor C7 couples the amplifying means 44,46 to the inverting portion 48 of the trigger circuit means 43,44,46,48 which is the monostable circuit defined by two NOR gates IC-2A, IC-2B, two resistors R15,R18, a capacitor C8, and a diode D2. A resistor R14 provides for discharge of the capacitor C7. A power supply current limiting resistor R17 is connected between the diode D1 and a resistor R16. A Zener diode D3 and a capacitor C9 are connected to the resistor R17 for powering the CMOS logic and for eliminating noise and other such electrical transients.

The output of the trigger circuit means 43,44,46,48 drives the alarm activation means, a MOSFET Q1, through a resistor R19 and a time delay capacitor C11. The MOSFET Q1 is configured in common source mode with the source terminal connected to ground. The MOSFET Q1 closes the circuit driving the piezo horn 42. A capacitor C10 is connected in parallel with the piezo horn 42 to suppress any noise which may be present in the circuit.

The inhibiting means 54,56,46,48 and the trigger circuit means 43,44,46,48 will never be needed at the same time because the time at which each event occurs are mutually exclusive. Said another way, operation of the inhibiting means 54,56,46,48 will never occur the same time the operation of the trigger circuit means 43,44,46,48 occurs. Therefore, both means 43,44,46,48; 54,56,44,48 may use the same amplifying means 44,46. In the preferred embodiment, however, the inhibiting means 54,56,46,48 only needs the amplification of the second stage 46 of the amplifying means 44,46. The inhibiting means 54,56,46,48 inhibits the circuit breaker means 24 from disconnecting the battery 12 from the electrical load 14 when the engine 31 is active. It will be apparent to one skilled in the art that several different possibilities of sensing whether the engine 31 is active. By way of example only, a list of possible sensing methods include sensing the rotation of a flywheel or electric current through a part of the electrical load 14.

In the preferred embodiment, the sensing method is to sense the noise or vibration created by the engine 31. This reduces the installation difficulties by eliminating the need to locate desirable positions for sensors because the noise or vibration created by the engine 31 can be heard or sensed from anywhere within the engine compartment 92. Vibration sensing means 94 transforms the energy it receives via sound waves into electrical signals. The vibration sensing means 94 may be any type of sensor 94 which can handle the environment of the engine 31. In the case of a vehicle 15, the vibration sensing means 94 must be able to withstand extreme heat and vibration. For the remainder of the discussion, the vibration sensing means 94 will be referred to as an electret microphone 94, although any other type of sensor, i.e., an accelerometer, which is capable of sensing vibrations produced by an engine 31 may be utilized. The electret microphone 94 has two terminals; one of which is connected to a capacitor C5 while the second of which is connected to ground. The electret microphone 94 is supported by the assembly housing 26 thus eliminating the need to know exactly where to place the microphone 86 so it may pick up the acoustic signals and yet not be damaged by the environment. The resistor R16 is connected to the second terminal of the electret microphone 94 and the capacitor C5. The other end of the capacitor C5 is connected to a resistor R12 which, along with the capacitor C5, couple the output of the electret microphone 94 to the second stage 46 of the amplifying means 44,46.

The output of the first NOR gate IC-2A will be low whenever the electret microphone 94 generates a signal representing the engine 31 is active. This will drive both the output of the second IC-2B and fourth IC-2D NOR gates low. The low output of the fourth NOR gate IC-2D will prevent the gate of the MOSFET Q2 from reaching a voltage high enough to allow a current to pass therethrough, thus inhibiting the circuit breaker means 24 from disconnecting the battery 12.

The alarm disabling means 58, as shown in FIG. 2, includes resistors R9, R10, inverter means (NOR gate) IC-2C and a diode D4. Whenever the circuit breaker means 24 is open, the voltage at the voltage sensing point 90 will drop to a relatively low level, because of the resistive divider set up by the resistor R1 and the parasitic resistive loads 86,88. The input to the inverter means IC-2C is held low by the resistor R10, connected between ground and another resistor R9, and, therefore, reverse biases the diode D4. The resistor R9 is also connected to the voltage sensing point 90. This allows the alarm 42 to operate properly. During normal operations, when the circuit breaker means 24 is closed, the voltage at the voltage sensing point 90 is high, allowing the output of the NOR gate IC-2D to go low, thereby pulling the gate of the MOSFET Q1 to ground through the diode D4. When the gate is pulled to ground, the circuit operating the alarm 42 is open, not allowing any power to reach the alarm 42. Thus, the alarm 42 cannot inadvertently be activated when the circuit breaker means 24 is closed.

The output of the monostable circuit 42 is the input for the NOR gate IC-2D wherein the output of the NOR gate IC-2D drives the gate of the inhibiting means 54,56,46,48 and, more particularly, the gate of the MOSFET Q2 so as to inhibit the circuit breaker means 24 from disconnecting the battery 12 from the electrical load 14 during operation of the engine 31.

Figure 4:
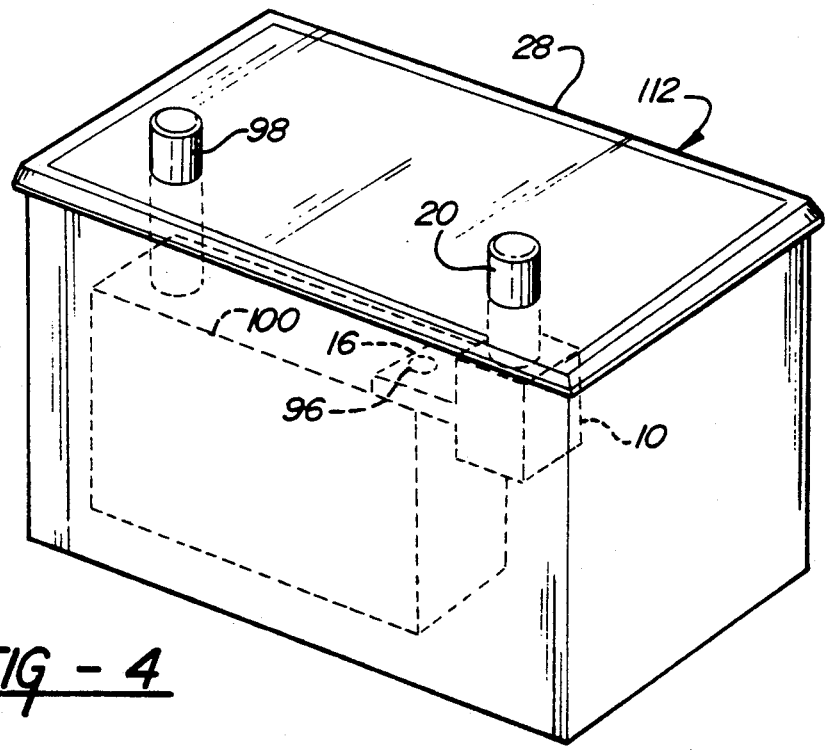
FIG. 4 is a perspective view of an alternative embodiment of the subject invention.

As may be seen in FIG. 4, the subject invention 10 is recessed within the battery housing 28 of a cell battery 112. The cell battery 112 includes positive 96 and negative 98 terminals, the battery disconnect assembly 10, and cell 100 for storing electrochemical energy. The battery disconnect circuit 10 was described in detail above and does not change in the alternative embodiment.

The battery disconnect circuit 10 is, however, fixedly secured to the positive terminal 96 of the cell battery 12. The positive terminal 96 in the this embodiment, terminates inside the battery housing 28. The electrical load terminal 20 resembles a positive terminal 96 of a standard cell battery. The electrical load terminal 20 is connected to the electrical load 14 of the vehicle 15 at one end and the battery disconnect circuit 10 at the other.

The positive terminal 96 is connected to the battery disconnect circuit 10 via the battery terminal 16 at one end and the cell 100 at the other. When the circuit breaker means 24, disclosed above, is closed, the electrical load terminal 20, the battery disconnect circuit 10 and the battery terminal 16 act as the positive terminal 96 wherein a charge may be transmitted through the three components 10,16,20.

When, however, the circuit breaker means 24 is disconnected, the electrical load terminal 20 and the battery terminal 16 are separated effectively separating the cell 100 from the electrical load 14. When the separation occurs, the electrochemical potential stored in the cell 100 may be reserved until the circuit breaker means 24 is reconnected via the motor 36. The motor 36 and its associated lockout means 52, discussed above, may be replaced by a reconnection button (not shown) wherein the circuit breaker means 24 is forced back to the closed position by pressing the reconnection button which is directly connected to the circuit breaker means 24 through an insulating material to protect against inadvertent short circuits.

The method for automatically disconnecting a battery 12 from the electrical load 14 associated with a vehicle 15 and engine 31 therefor includes using a switchable circuit breaker 24 connected between the battery 12 and the electrical load 14. Changes in the voltage are sensed by a voltage sensor 48. The method comprising the steps of measuring the voltage of the battery 12; comparing the voltage measured with a predetermined voltage level; and opening the circuit breaker means 24 in response to measuring a voltage below the predetermined voltage level. The method is characterized by producing an alarm signal when the circuit breaker 24 is open and in response to a predetermined change in load applied to the electrical load 14 as sensed by the voltage sensor 48.

The method further includes the step of preventing the circuit breaker 24 from reconnecting the battery 12 to the electrical load 14 for a for a predetermined time after the voltage sensor 48 senses the predetermined change in load. The alarm 42 is prevented from producing a signal recognizable by the operator of the vehicle 15 so long as the circuit breaker 24 is closed interconnecting the battery 12 to the electrical load 14.

The circuit breaker 24 is prevented from moving to the open position in response to vibrations produced by the operation of the engine 31. The vibrations detected acoustic vibrations and they are detected by a microphone 94. This prevents the battery 12 from being disconnected from the electrical load 14 while the engine 31 is running. The voltage level of the battery 12 may drop below the predetermined level while the engine 31 is running because a part of the alternator system, incorporated in the engine 31, may not be operating faulty. One such possibility of a faulty operation is a broken or worn alternator belt. If the alternator is not being rotated by the engine 31, the engine 31 must rely on the battery 12 for the production of all electrical signals. The battery 12 cannot retain a voltage level very long under this condition but it is better to allow the operator to continue operating the engine 31 until the operator can reach safety as opposed to immediately disconnecting the battery 12 thus stranding the operator in a potentially dangerous situation.

The method further includes the step of producing an audible sound in response to the alarm signal. As was described above, the ability to produce an audible alarm eliminates the necessity of wiring the alarm into the passenger compartment.

The method further includes passing a current from the battery 12 to the alarm 42 and the voltage sensor 48 after the circuit breaker 24 has disconnected the battery 12 from the electrical load 14. By allowing a small current to pass to these components, the system can properly identify the presence of the operator and can, without a major expenditure of voltage, selectively operate the alarm 42 to warn the operator of the condition of the battery 12. The operator's presence is determined by sensing the predetermined change in load from the current passed to the voltage sensor 48. This sensing is only performed after the circuit breaker 24 has been disconnected. The method also includes the step of amplifying the predetermined change in load so the voltage sensor 48 may be able to detect the predetermined change in the electric load 14.

The invention has been described in an illustrative manner, and it is to be understood that the terminology which has been used is intended to be in the nature of words of description rather than of limitation.

Obviously, many modifications and variations of the present invention ar possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An automatic battery disconnect assembly (10) for disconnecting a battery (12) from the electrical load (14) associated with a vehicle (15) and engine (31) therefor when the battery (12) drops below a predetermined voltage, said assembly (10) comprising:

a battery terminal (16) for connection to a battery (12);

an electrical load terminal (20) for supplying all electrical power to a vehicle (15);

a main circuit (22) electrically connecting said terminals (16,20) and including circuit breaker means (24) movable between an open position and a closed position for opening said main circuit (22) to disconnect said battery terminal (16) from said electrical load terminal (20);

voltage measuring means (32) for measuring the voltage available at said battery terminal (16) for opening said circuit breaker mans (24) in response to measuring a predetermined low voltage;

voltage sensing means (48) for sensing a change in voltage at said electrical load terminal (20) due to a predetermined change in load (14), said assembly (10) characterized by trigger circuit means (43,44,46,48) for producing an alarm signal only when said circuit breaker means (24) is open and when said voltage sensing means (48) senses said predetermined change in load (14) applied to said electrical load terminal (20).

2. An assembly (10) as set forth in claim 1 further characterized by including inhibiting means (54,56,46,48) for preventing said voltage measuring means (32) from opening said main circuit (22) in response to vibrations produced by the operation of the engine (31).

3. An assembly (10) as set forth in claim 1 further characterized by including alarm disabling means (58) for preventing said trigger circuit means (43,44,46,48) from producing an alarm signal so long as said circuit breaker means (24) is closed to interconnect said terminals (16,20).

4. An assembly (10) as set forth in claim 1 further characterized by lockout means (52) for preventing said circuit breaker means (24) from moving to said closed position for a predetermined time after said predetermined change in load.

5. An assembly (10) as set forth in any one of claims 1, 2, 3 or 4 further characterized by including an alarm (42) for producing an audible sound in response to said alarm signal.

6. An assembly (10) as set forth in claim 5 wherein said inhibiting means (54,56,46,48) includes vibration sensing means (94) for sensing the vibrations produced by the engine (31).

7. An assembly (10) as set forth in claim 6 further characterized by said entire assembly (10) being recessed in a battery housing (28) wherein said battery terminal (16) extends from the battery housing (28).

8. An assembly (10) as set forth in claim 1 further characterized by lockout means (52) for preventing said circuit breaker means (24) from moving to said closed position for a predetermined time after said predetermined change in load, alarm disabling means (58) for preventing said trigger circuit means (43,44,46,48) from producing an alarm signal so long as said circuit breaker means (24) is closed to interconnect said terminals (16,20), inhibiting means (54,56,46,48) for preventing said voltage measuring means (32) from opening said main circuit (22) in response to vibrations produced by the operation of the engine (31), said inhibiting means (54,56,46,48) including vibration sensing means (94) for sensing the vibrations produced by the operation of the engine (31), an alarm (42) for producing an audible sound in response to said alarm signal.

9. An assembly (10) as set forth in claim 8 including an assembly housing (26) enclosing all of said assembly (10) with said terminals (16,20) extending therefrom, and wherein said alarm (42) is supported by said assembly housing (26) to emanate sound exteriorly of said assembly housing (26) and said vibration sensing means (94) is supported by said assembly housing (26).

10. An assembly (10) as set forth in claim 7 further characterized by said vibration sensing means (94) includes a sound microphone (94) supported by said assembly housing (26) for sensing sound vibrations exteriorly of said assembly housing (26).

11. An assembly (10) as set forth in claim 5 further characterized by said trigger circuit means (43,44,46,48) including resistive means (R1) providing a path parallel to said circuit breaker means (24) for passing a current from the battery (12) to said trigger circuit means (43,44,46,48) after said circuit breaker means (24) has disconnected the battery (12) from the electrical load (14).

12. An assembly (10) as set forth in claim 11 further characterized by including amplifying means (44,46) for amplifying said predetermined change in load.

13. An assembly (10) as set forth in claim 12 further characterized by said amplifying means (44,46) including a high gain A.C. amplifier (44,46).

14. An assembly (10) as set forth in claim 1 including resistive means (R1) providing a path parallel to said circuit breaker means (24) for passing a current from the battery (12) to said trigger circuit means (43,44,46,48) after said circuit breaker means (24) has disconnected the battery (12) from the electrical load (14); voltage sensing means (48) for sensing said predetermined change in load (34) through said resistive means (R1); amplifying means (44,46) for amplifying said predetermined change in load, said amplifying means (44,46) including an A.C. amplifier (44,46); an alarm (42) for producing an audible signal representing the disconnection of the battery (12) from the electrical load (14); inhibiting means (54,56,46,48) for preventing said voltage measuring means (32) from opening said main circuit (22) in response to vibrations produced by the operation of the engine (31) said trigger circuit means (43,44,46,48), said inhibiting means (54,56,46,48) further including inhibitor switching means (Q2) for inhibiting said circuit breaker means (24) from disconnecting the battery (12) from the electrical load (14) when the signal from the amplifying means (44,46) represents an active engine (31).

15. An assembly (10) as set forth in claim 14 further characterized by alarm activation means (Q1) having an open condition and a closed condition for activating said alarm (42) when said voltage drop is sensed by said voltage sensing means (48) by said alarm activation means (Q1) moving to said closed condition.

16. An assembly (10) as set forth in claim 15 further characterized by said alarm disabling means (58) including inverter means (IC-2C) for driving said alarm activation means (Q1) to said open condition when said circuit breaker means (24) has not disconnected the electrical load (14).

17. An automatic battery disconnect assembly (10) for disconnecting a battery (12) from the electrical load (14) associated with a vehicle (15) and engine (31) therefor when the battery (12) drops below a predetermined voltage, said assembly (10) comprising:
a battery terminal (16) for connection to a battery (12);
an electrical load terminal (20) for supplying all electrical power to a vehicle (15);
a main circuit (22) electrically connecting said terminals (16,20) and including circuit breaker means (24) movable between an open position and a closed position for opening said main circuit (22) to disconnect said battery terminal (16) from said electrical load terminal (20);
voltage measuring means (32) for measuring the voltage available at said battery terminal (16) for opening said circuit breaker mans (24) in response to measuring a predetermined low voltage;
voltage sensing means (48) for sensing a change in voltage at said electrical load terminal (20) due to a predetermined change in load (14), said assembly (10) characterized by
trigger circuit means (43,44,46,48) interconnecting said terminals independently of said main circuit (22) for producing an audible sound alarm only when said circuit breaker means (24) is open and when said voltage sensing means (48) senses said predetermined change in load applied to said electrical load terminal (20) and inhibiting means (54,56,46,48) for preventing said voltage measuring means (32) from opening said main circuit (22) and including vibration sensing means (94) for sensing sound vibrations produced by the operation of the engine (31).

18. An automatic battery disconnect assembly (10) for disconnecting a battery (12) from the electrical load (14) associated with a vehicle (15) and engine (31) therefor when the battery (12) drops below a predetermined voltage, said assembly (10) comprising:
an automotive vehicle (15);
an engine (31) associated with said automotive vehicle (15) producing audible sound vibrations;
a battery (12);
an electrical operating system (14) electrically connected to said battery (12) for operating said engine (31);
a starting subsystem (30) having a starting load switch (50) for starting said engine (31) upon the closing of said starting load switch (50);
a battery terminal (16) for connection to said battery (12);

an electrical load terminal (20) for supplying all electrical power to said electrical operating system (14);

a main circuit (22) electrically connecting said terminals (16,20) and including circuit breaker means (24) movable between an open position and a closed position for opening said main circuit (22) to disconnect said battery terminal (16) from said electrical load terminal (20);

voltage measuring means (32) for measuring the voltage available at said battery terminal (16) for opening said circuit breaker mans (24) in response to measuring a predetermined low voltage;

voltage sensing means (48) for sensing a change in voltage at said electrical load terminal (20) due to a predetermined change in load (14), said assembly (10) characterized by trigger circuit means (43,44,46,48) interconnecting said terminals (16,20) independently of said main circuit (22) for producing an alarm signal only when said circuit breaker means (24) is open and when said voltage sensing means (48) senses the closing of said starting load switch (50) of said starting subsystem (30) and inhibiting means (54,56,46,48) for preventing said voltage measuring means (32) from opening said main circuit (22) and including vibration sensing means (94) for sensing sound vibrations produced by the operation of said engine (31).

19. An automatic battery disconnect circuit (10) for disconnecting a battery (12) from the electrical load (14) associated with a vehicle (15) and engine (31) therefor when the battery (12) drops below a predetermined voltage, said assembly (10) comprising:

a circuit breaker (24) connected in series between the battery (12) and the electrical load circuit (14); a resistor (R1) connected in parallel with said circuit breaker (24); an A.C. amplifier (44,46) connected to said resistor (R1); a voltage sensing circuit (48) connected to said A.C. amplifier (44,46); a switchable alarm circuit (40) connected to said voltage sensing circuit (48); a voltage measuring circuit (32) connected to the battery (12); an alarm disabling circuit (48) connected to said circuit breaker (24) and said switchable alarm circuit (40) such that said switchable alarm circuit (40) is activated only when the circuit breaker (24) is open due to said voltage measuring circuit (32) measuring a predetermined low voltage and when said voltage sensor circuit (48) senses a predetermined change in load.

20. A circuit as set forth in claim 19 further characterized by a lockout circuit (44) having two leads electrically connected to said voltage measuring circuit (16) and said voltage sensing circuit (48).

21. A circuit as set forth in claim 20 further characterized by an H-switch circuit (62) for changing the signals on the two leads of said lockout circuit (52).

22. A circuit as set forth in claim 21 further characterized by said lockout circuit (52) further including a reversible motor (36) having two leads wherein each of said two leads are connected to said H-switch (62).

23. A circuit as set forth in claim 22 further characterized by said H-switch (62) further including a dual pole double throw switch controlled by two relays (74,76), said H-switch (62) having two inputs and two outputs wherein one of said inputs is connected to said voltage measuring circuit (32) and the other of said inputs is connected to said voltage sensing circuit (48) and said two outputs are connected to said leads to said lockout circuit (52).

24. A circuit as set forth in claim 23 further characterized by two monostable multivibrators (56,58) each connected to one of said inputs of said H-switch circuit (50).

25. A circuit as set forth in any one of claims 19 or 24 further characterized by an alarm disabling circuit (48) connected to said circuit breaker (24) and said switchable alarm circuit (40) wherein said alarm disabling circuit (48) comprises a NOR gate (IC-2C) which is connected to said circuit breaker (24) in parallel with a resistor (R10), and the output of said NOR gate (IC-2C) is connected in series to a reverse biased diode (D4), said reverse biased diode (D4) connected to the gate of a first MOSFET (Q1) of said switchable alarm circuit (40).

26. A circuit as set forth in claim 25 further characterized by said two stage cascading amplifier (44,46) having two operational amplifiers (IC-1A, IC-1B) wherein each of said two operational amplifiers (IC-1A, IC-1B) amplifies the voltage across said resistor (R1) thirty times producing an amplified signal.

27. A circuit as set forth in claim 26 further characterized by said operational amplifiers (IC-1A, IC-1B) having filters (R6, C3 and R13, C6, respectively) and being AC coupled together through a capacitor (C4) and a resistor (R7).

28. A circuit as set forth in claim 27 further characterized by an inhibiting circuit (46) for inhibiting said circuit breaker (24) from disconnecting the electrical load (14) circuit from the battery (12) when the engine (31) is running.

29. A circuit as set forth in claim 28 further characterized by said inhibiting circuit (46) including an electret microphone (94) having two terminals wherein one of said two terminals being connected to the inverting input of said second operational amplifier (IC-1B) to amplify the output of said electret microphone (94).

30. A circuit as set forth in claim 29 further characterized by said voltage sensing circuit (48) utilizing the amplified signal from said second operational amplifier (IC-1B) to reverse bias a diode (D7) such that said diode (D7) inhibits a second MOSFET (Q2) from conducting.

31. A circuit as set forth in claim 30 further characterized by said alarm circuit (40) including a capacitor (C10) connected in parallel with an alarm (42), both connected in series with a first MOSFET (Q1) wherein said alarm (42) will produce an audible signal whenever said first MOSFET (Q1) is conducting.

32. A circuit as set forth in claim 31 further characterized by said alarm circuit (40) further including a timing delay circuit comprising a resistor (R19) and a capacitor (C11), each connected to the gate of said first MOSFET (Q1) wherein said capacitor (C11) is also connected to ground and said resistor (R19) is connected to the output of said inverting circuit (42).

33. A circuit as set forth in claim 32 further characterized by said voltage measuring circuit (32) including a third operational amplifier (IC-1C) wherein a reference voltage is established by a micropower voltage reference (D5) and is connected to the noninverting input of said third operational amplifier (IC-1C).

34. A circuit as set forth in claim 33 further characterized by a trimmer resistor (R21) being connected to the inverting input of said third operational amplifier (IC-1C) to establish a voltage divider.

35. A circuit as set forth in claim 34 further characterized by a resistor (R25) and a capacitor (C14) establishing a timing delay wherein said circuit breaker (24) will not move to the open position unless a voltage drop is sensed for a period of time greater than that established by said timing delay.

36. A circuit as set forth in claim 35 further characterized by a diode (D6) connected in parallel with said resistor (R25) to immediately reset said timing delay if the predetermined change in load does not last as long as the time established by said timing delay.

37. A circuit as set forth in claim 36 further characterized by a fourth operational amplifier (IC-1D) receiving the output of said third operational amplifier (IC-1C) as the input of the noninverting input of said fourth operational amplifier (IC-1D).

38. A circuit as set forth in claim 37 further characterized by said second MOSFET (Q2) being connected to the output of said fourth operational amplifier (IC-1D) wherein said second MOSFET (Q2) is conductive when the input of the noninverting input of said fourth operational amplifier (IC-1D) is equal to the input applied to the inverting input of said fourth operational amplifier (IC-1D).

39. A method for automatically disconnecting a battery (12) from the electrical load (14) associated with a vehicle (15) and engine (31) therefor using a voltage measurer (32), a switchable circuit breaker (24) connected between the battery (12) and the electrical load (14), and a voltage sensor (48) for sensing changes in the electrical load (14), the method comprising the steps of:
measuring the voltage of the battery (12) with a voltage measurer (32);
comparing the voltage measured with a predetermined voltage level;
opening the circuit breaker means (24) in response to the voltage measurer (12) measuring a voltage below the predetermined voltage level, the method characterized by
producing an alarm signal only when the circuit breaker (24) is open and when a predetermined change in load applied to the electrical load (14) is sensed by a voltage sensor (48).

40. A method as set forth in claim 39 further characterized by preventing the circuit breaker (24) from reconnecting the battery (12) to the electrical load (14) for a for a predetermined time after the voltage sensor (48) senses the predetermined change in load.

41. A method as set forth in claim 39 further characterized by preventing the production of the alarm signal so long as the circuit breaker (24) is closed interconnecting the battery (12) to the electrical load (14).

42. A method as set forth in claim 39 further characterized by preventing the circuit breaker (24) from moving to the open position in response to vibrations produced by the operation of the engine (31).

43. A method as set forth in claim 42 further characterized by sensing sound vibrations produced by the operation of the engine (31).

44. A method as set forth in claim 42 further characterized by producing an audible sound in response to the alarm signal.

45. A method as set forth in any one of claims 39, 40, 41, or 42 further characterized by passing a current from the battery (12) to the alarm (42) and the voltage sensor (48) after the circuit breaker (24) has disconnected the battery (12) from the electrical load (14).

46. A method as set forth in claim 45 further characterized by sensing the predetermined change in load from the current passed to the voltage sensor (48) after the circuit breaker (24) has been disconnected.

47. A method as set forth in claim 46 further characterized by amplifying the predetermined change in load.

* * * * *